(12) United States Patent
Yang et al.

(10) Patent No.: US 11,345,974 B2
(45) Date of Patent: May 31, 2022

(54) COLD ROLLED STEEL SHEET AND METHOD FOR MANUFACTURING THE SAME

(71) Applicant: JFE Steel Corporation, Tokyo (JP)

(72) Inventors: Lingling Yang, Tokyo (JP); Tatsuya Nakagaito, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 78 days.

(21) Appl. No.: 16/975,227

(22) PCT Filed: Feb. 26, 2019

(86) PCT No.: PCT/JP2019/007276
§ 371 (c)(1),
(2) Date: Aug. 24, 2020

(87) PCT Pub. No.: WO2019/167933
PCT Pub. Date: Sep. 6, 2019

(65) Prior Publication Data
US 2020/0399730 A1    Dec. 24, 2020

(30) Foreign Application Priority Data
Feb. 28, 2018  (JP) .............................. JP2018-034244

(51) Int. Cl.
| | | |
|---|---|---|
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |

(Continued)

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C22C 38/32* (2013.01); *C22C 38/38* (2013.01); *C22C 38/60* (2013.01); *C23C 2/06* (2013.01); *C23C 2/28* (2013.01); *C23C 2/40* (2013.01); *C21D 2211/005* (2013.01)

(58) Field of Classification Search
CPC . B32B 15/013; C21D 2211/005; C21D 6/002; C21D 6/005; C21D 6/008; C21D 8/0205; C21D 8/0226; C21D 8/0236; C21D 8/0273; C21D 9/46; C22C 38/001; C22C 38/002; C22C 38/004; C22C 38/005; C22C 38/008; C22C 38/02; C22C 38/04; C22C 38/06; C22C 38/08; C22C 38/10; C22C 38/12; C22C 38/14; C22C 38/16; C22C 38/28; C22C 38/32; C22C 38/38; C22C 38/60; C22C 2/06; C22C 2/28; C22C 2/40

See application file for complete search history.

(56) References Cited

U.S. PATENT DOCUMENTS

| 9,297,052 B2 | 3/2016 | Kimura et al. |
| 2014/0212684 A1 | 7/2014 | Kawata et al. |

(Continued)

FOREIGN PATENT DOCUMENTS

| EP | 2554687 A1 | 2/2013 |
| EP | 3342893 A1 | 7/2018 |

(Continued)

OTHER PUBLICATIONS

Korean Grant of Patent for Korean Application No. 10-2020-7024310, dated Dec. 27, 2021, with translation, 3 pages.
International Search Report and Written Opinion for International Application No. PCT/JP2019/007376, dated Apr. 23, 2019, 7 pages.
Chinese Office Action with Search Report for Chinese Application No. 201980015505.6, dated May 7, 2021, 7 pages.

(Continued)

*Primary Examiner* — Jenny R Wu
(74) *Attorney, Agent, or Firm* — RatnerPrestia

(57) ABSTRACT

A cold rolled steel sheet of the present invention has a specific chemical composition and a steel microstructure in which the average aspect ratio of ferrite crystal grains is 2.0 or less; an $r_{ave}$ value that is the average value of values obtained by measuring the r-value represented by a first predetermined formula in three places apart with spacings of 200 mm in the sheet width direction is 1.20 or more, and $|\Delta r_{ave}|$ that is the average value of values obtained by measuring, in three places apart with spacings of 200 mm in the sheet width direction, $|\Delta r|$ that is the absolute value of $\Delta r$ represented by a second predetermined formula is 0.40 or less and the difference between the largest value and the smallest value of $|\Delta r|$ among the three places is 0.15 or less.

12 Claims, No Drawings

(51) Int. Cl.
   *C22C 38/28* (2006.01)
   *C22C 38/32* (2006.01)
   *C22C 38/38* (2006.01)
   *C22C 38/60* (2006.01)
   *C23C 2/06* (2006.01)
   *C23C 2/28* (2006.01)
   *C23C 2/40* (2006.01)

(56) References Cited

U.S. PATENT DOCUMENTS

| | | |
|---|---|---|
| 2018/0044753 A1 | 2/2018 | Honda et al. |
| 2019/0185955 A1 | 6/2019 | Yang et al. |
| 2020/0123631 A1 | 4/2020 | Mikasa |

FOREIGN PATENT DOCUMENTS

| | | |
|---|---|---|
| JP | 04259353 A | 9/1992 |
| JP | 2013100594 A | 5/2013 |
| JP | 2014015651 A * | 1/2014 |
| JP | 2014015651 A | 1/2014 |
| JP | 2014028998 A | 2/2014 |
| JP | 2015063729 A | 4/2015 |
| KR | 20120113791 A | 10/2012 |
| KR | 20150004639 A | 1/2015 |
| KR | 20180043324 A | 4/2018 |
| WO | 2013018739 A1 | 2/2013 |
| WO | 2016152148 A1 | 9/2016 |
| WO | 2018043452 A1 | 3/2018 |
| WO | 2018194059 A1 | 10/2018 |

OTHER PUBLICATIONS

Extended European Search Report for European Application No. 19 760 952.2, dated Feb. 25, 2021, 7 pages.

* cited by examiner

COLD ROLLED STEEL SHEET AND METHOD FOR MANUFACTURING THE SAME

CROSS REFERENCE TO RELATED APPLICATIONS

This is the U.S. National Phase application of PCT/JP2019/007276, filed Feb. 26, 2019, which claims priority to Japanese Patent Application No. 2018-034244, filed Feb. 28, 2018, the disclosures of these applications being incorporated herein by reference in their entireties for all purposes.

FIELD OF THE INVENTION

The present invention relates mainly to a cold rolled steel sheet suitably used for an automotive outer sheet or the like and a method for manufacturing the same. Specifically, the present invention is a cold rolled steel sheet that has a high r-value, has small in-plane anisotropy of the r-value, and is excellent in material uniformity in the sheet width direction, and a method for manufacturing the same.

BACKGROUND OF THE INVENTION

These days, improving automotive fuel efficiency in order to reduce carbon dioxide $CO_2$ emissions has been becoming an important issue in, for example, the automotive industry, from the viewpoint of the preservation of the global environment. To improve automotive fuel efficiency, it is effective to reduce the weight of the automotive body; to this end, it is necessary to reduce the weight of the automotive body while maintaining the strength of the automotive body. If it is possible to increase the strength of steel sheets serving as raw materials for automotive parts, simplify the microstructure, and reduce the number of parts, weight reduction can be achieved. However, steel sheets with increased strength are much poorer in formability, particularly deep drawability, than mild steel sheets. Further, depending on the target part, also reduction in in-plane anisotropy is required, because smaller in-plane anisotropy contributes to improvement in formability, even with the same r-value (Lankford value). Further, there is a method in which Nb or Ti is added and solute carbon or nitrogen is fixed in steel in order to achieve a high r-value. In the case where large amounts of alloying elements are added, precipitates are generated, and variation in material in a coil, particularly in the coil width direction, is increased. In view of the fact that it is difficult to stably perform press forming, material uniformity in the widthwise direction of the coil is demanded.

Patent Literature 1 discloses a high strength cold rolled steel sheet that has high strength and is excellent in deep drawability and in-coil material uniformity and a method for manufacturing the same. Further, Patent Literature 2 discloses a cold rolled steel sheet and a galvanized steel sheet excellent in deep drawability and a method for manufacturing the same. Further, Patent Literature 3 discloses a high strength hot-dip galvanized steel sheet excellent in deep drawability and a method for manufacturing the same.

PATENT LITERATURE

Patent Literature 1: JP 2013-100594 A
Patent Literature 2: JP 2014-28998 A
Patent Literature 3: JP 2015-63729 A

SUMMARY OF THE INVENTION

The technology described in Patent Literature 1 does not take into consideration the r-value in the sheet width direction and in-plane anisotropy.

Each of the technologies described in Patent Literature 2 and Patent Literature 3 has a description regarding the control of the r-value and in-plane anisotropy, but does not have a description of variation in material in the sheet width direction and hence has a practical issue regarding material uniformity in the sheet width direction.

As described above, all the conventional technologies have practical issues. Aspects of the present invention favorably solve the problems that the conventional technologies mentioned above have, and an object according to aspects of the present invention is to provide a cold rolled steel sheet that has a high r-value, has small in-plane anisotropy of the r-value, and is excellent in material uniformity in the sheet width direction, and a method for manufacturing the same.

In order to achieve the above object, the present inventors have made intensive studies to solve the above issues, and have obtained the following findings.

(1) The smaller the average aspect ratio of ferrite crystal grains is, the higher the r-value is, and the smaller the in-plane anisotropy of the r-value is.

(2) To control the average aspect ratio mentioned above, reverse bending in a soaking section are effective.

(3) Material quality in the sheet width direction is susceptible to the annealing temperature, the cooling rate, etc. If a difference in coiling temperature in the sheet width direction is reduced, variation in material in the sheet width direction can be reduced. Further, also a finding that variation in material in the sheet width direction of a steel sheet can be reduced by rapid heating in a heating section was obtained in the course of completion of aspects of the present invention.

Aspects of the present invention have been completed on the basis of the above findings, and the above-described issues can be solved by the following means.

[1] A cold rolled steel sheet including a chemical composition containing, in mass %, C: 0.0003 to 0.010%, Si: 0.01 to 1.0%, Mn: 0.10 to 3.0%, P: 0.005 to 0.15%, S: 0.020% or less, Al: 0.01 to 1.00%, and N: 0.005% or less, further containing any one or more of Nb: 0.005 to 0.10%, Ti: 0.01 to 0.10%, and B: 0.0001 to 0.0030%, and a balance being iron and incidental impurities, and having a steel microstructure in which an average aspect ratio of ferrite crystal grains is 2.0 or less, in which an $r_{ave}$ value that is an average value of values obtained by measuring an r-value represented by Formula (1) below in three places apart with spacings of 200 mm in a sheet width direction is 1.20 or more, and $|\Delta r_{ave}|$ that is an average value of values obtained by measuring, in three places apart with spacings of 200 mm in the sheet width direction, $|\Delta r|$ that is an absolute value of $\Delta r$ represented by Formula (2) below is 0.40 or less and a difference between a largest value and a smallest value of $|\Delta r|$ among the three places is 0.15 or less, $$r\text{-value} = (r_0 + 2r_{45} + r_{90})/4 \qquad \text{Formula (1):}$$

$$\Delta r = (r_0 - 2r_{45} + r_{90})/2 \qquad \text{Formula (2):}$$

in Formula (1) and Formula (2) above, $r_0$, $r_{45}$, and $r_{90}$ being Lankford values in directions of 0°, 45°, and 90°, respectively, based on a rolling direction of the steel sheet.

[2] The cold rolled steel sheet according to [1], in which the chemical composition further contains any one or more of Cr, Cu, Ni, Sn, As, Sb, Ca, Mg, Pb, Co, Ta, W, REMs, Zn, Sr, Cs, Hf, and V at 1% or less in mass % in total.

[3] The cold rolled steel sheet according to [1] or [2], including a coating layer on a surface.

[4] The cold rolled steel sheet according to [3], in which the coating is a hot-dip galvanizing layer or a galvannealing layer.

[5] A method for manufacturing a cold rolled steel sheet, the method including a hot rolling step of hot rolling a steel raw material having the chemical composition according to [1] or [2] and performing coiling under a condition where a difference in coiling temperature in the sheet width direction is 40° C. or less, a cold rolling step of cold rolling a hot rolled steel sheet obtained by the hot rolling step at a cold rolling reduction rate of 30 to 75%, and an annealing step of heating a cold rolled steel sheet obtained by the cold rolling step at an average heating rate of 35° C./s or more through a range of 350 to 650° C. in a continuous annealing facility including a pre-heating section, a heating zone, a soaking section, and a cooling zone and performing soaking at a soaking temperature of 700 to 900° C. and for a soaking time of 1 to 200 seconds, and performing, in the soaking, reverse bending four times or more in total with a roll having a radius of 100 mm or more.

[6] The method for manufacturing a cold rolled steel sheet according to [5], including, after the annealing step, a coating step of performing coating treatment.

[7] The method for manufacturing a cold rolled steel sheet according to [6], in which the coating treatment is a coating treatment that forms a hot-dip galvanizing layer or a coating treatment that forms a galvannealing layer.

According to aspects of the present invention, a cold rolled steel sheet that has yield strength of 320 MPa or more, a high r-value, and small in-plane anisotropy of the r-value and is excellent in material uniformity in the sheet width direction, and a method for manufacturing the same can be provided.

DETAILED DESCRIPTION OF EMBODIMENTS OF THE INVENTION

Hereafter, embodiments of the present invention will be described. Here, the present invention is not limited to the embodiments described below.

First, a chemical composition of the cold rolled steel sheet according to aspects of the present invention will be described. Note that in the following description of the chemical composition, "%" that is the unit of the content amount of a composition means "mass %".

C: 0.0003 to 0.010%

C is a necessary element to raise strength. If a content amount of C is less than 0.0003%, a crystal grain size is coarsened and yield strength is greatly reduced, and hence defects are likely to occur during processing. Thus, the content amount of C is set to 0.0003% or more. The content amount of C is preferably 0.0005% or more, more preferably 0.0008% or more, and still more preferably 0.0010% or more. On the other hand, if the content amount of C is more than 0.010%, a development of texture is suppressed, and a high r-value is not obtained. If the content amount of C is increased, an amount of precipitate is increased, and hence defects are likely to occur during forming. Thus, the content amount of C is set to 0.010% or less. The content amount of C is preferably 0.008% or less, more preferably 0.006% or less, and still more preferably 0.005%.

Si: 0.01 to 1.0%

Si is an element having an effect of enhancing a hardness of the steel sheet by solute strengthening. To stably ensure yield strength, the containing of 0.01% or more Si is needed. The content amount of Si is preferably 0.08% or more, more preferably 0.10% or more, and still more preferably 0.12% or more. On the other hand, if the content amount of Si is more than 1.0%, degradation in ductility, surface quality, and weldability is caused; thus, the upper limit of the content amount of Si is set to 1.0%. The content amount of Si is preferably 0.8% or less, more preferably 0.6% or less, and still more preferably 0.5% or less.

Mn: 0.10 to 3.0%

Mn is an element having an effect of enhancing a hardness of the steel sheet by solute strengthening. To stably ensure yield strength, the containing of 0.10% or more Mn is needed. The content amount of Mn is preferably 0.20% or more, more preferably 0.40% or more, and still more preferably 0.60% or more. On the other hand, if the content amount of Mn is large, ductility degradation due to solute strengthening is considerable, and the r-value is reduced and consequently formability is reduced; thus, the content amount of Mn is set to 3.0% or less. The content amount of Mn is preferably 2.8% or less, more preferably 2.6% or less, and still more preferably 2.5% or less.

P: 0.005 to 0.15%

P has, as a solute strengthening element, an effect of improving strength of the steel. Thus, a content amount of P is set to 0.005% or more. The content amount of P is preferably 0.007% or more, more preferably 0.010% or more, and still more preferably 0.020% or more. On the other hand, P segregates at grain boundaries, and reduces formability. Thus, the content amount of P is set to 0.15% or less. The content amount of P is preferably 0.12% or less, more preferably 0.10% or less, and still more preferably 0.09% or less.

S: 0.020% or less

S bonds to Mn and forms coarse MnS, and reduces formability. Thus, the content amount of S is preferably reduced. In accordance with aspects of the present invention, it is preferable that the content amount of S be 0.020% or less. The content amount of S is preferably 0.017% or less, more preferably 0.015% or less, and still more preferably 0.014% or less. A lower limit of the content amount of S is not particularly limited, and the content amount of S is preferably as small as possible; however, an attempt to excessively reduce the content amount of S takes time and effort and increases manufacturing cost; thus, the content amount of S is preferably 0.0001% or more from the viewpoints of manufacturing cost and ease of manufacturing.

Al: 0.01 to 1.00%

If large amounts of oxides exist in the steel, ductility is reduced; thus, deoxidation is important. To obtain this effect, a content amount of Al is set to 0.01% or more. The content amount of Al is preferably 0.02% or more, and more preferably 0.03% or more. On the other hand, if the content amount of Al is more than 1.00%, oxides and nitrides coagulate and coarsen and ductility is reduced, and formability is reduced. Thus, the content amount of Al is set to 1.00% or less. The content amount of Al is preferably 0.09% or less, more preferably 0.08% or less, and still more preferably 0.07% or less.

N: 0.005% or less

If a large amount of N is contained, surplus nitrides are generated, and the ductility of the steel sheet is reduced. Further, processability is degraded. Thus, a content amount of N is set to 0.005% or less. A lower limit of the content amount of N is not particularly limited, and the content amount of N is preferably as small as possible; however, an attempt to excessively reduce the content amount of N takes time and effort and increases manufacturing cost; thus, the content amount of N is preferably 0.0001% or more from the viewpoints of manufacturing cost and ease of manufacturing.

The chemical composition mentioned above further contains at least one or more of Nb: 0.005 to 0.10%, Ti: 0.01 to 0.10%, and B: 0.0001 to 0.0030%.

Nb: 0.005 to 0.10%

Nb bonds to C and precipitates as carbide of NbC, fixes part of solute C existing in the steel, and develops texture of the steel sheet; thus, contributes to improvement in the r-value and reduction in the absolute value of the $\Delta$r-value. Further, fine carbonitrides of Nb have an effect in the increasing of hardness. To obtain these effects, in the case where Nb is contained, the content amount of Nb needs to be set to 0.005% or more. The content amount of Nb is preferably 0.010% or more, and more preferably 0.020% or more. On the other hand, if the content amount of Nb is more than 0.10%, not only the cost of alloy is increased, but also the recrystallization ending temperature is raised, texture is not developed, and the r-value is reduced. Further, the rolling load is increased, and consequently stable steel sheet manufacturing becomes difficult. Thus, in the case where Nb is contained, the content amount of Nb is set to 0.10% or less. The content amount of Nb is preferably 0.08% or less, more preferably 0.06% or less, and still more preferably 0.05% or less.

Ti: 0.01 to 0.10% Similar to Nb, Ti bonds to C and precipitates as a carbide of TiC, fixes part of solute C existing in the steel, and develops texture of the steel sheet; thus, contributes to improvement in the r-value and reduction in the absolute value of the $\Delta$r-value. Further, fine carbonitrides of Ti have an effect in the rising of hardness. To obtain these effects, in the case where Ti is contained, the content amount of Ti needs to be set to 0.01% or more. The content amount of Ti is preferably 0.02% or more, and more preferably 0.03% or more. On the other hand, if the content amount of Ti is more than 0.10%, the recrystallization ending temperature is raised, texture is not developed, and the r-value is not increased. Further, the rolling load is increased, and consequently stable steel sheet manufacturing becomes difficult. Thus, in the case where Ti is contained, the content amount of Ti is set to 0.10% or less. The content amount of Ti is preferably 0.09% or less, more preferably 0.08% or less, and still more preferably 0.06% or less.

B: 0.0001 to 0.0030%

B is an effective element to strengthen the grain boundary and improve processability. Further, when B is contained, there are effects in improvement in the r-value and reduction in the absolute value of the $\Delta$r-value. In the case where B is contained, the content amount of B needs to be set to 0.0001% or more. The content amount of B is preferably 0.0003% or more, more preferably 0.0004% or more, and still more preferably 0.0005% or more. On the other hand, if the content amount of B is more than 0.0030%, B forms $Fe_{23}(CB)_6$, and degrades processability. Thus, the content amount of B is set to 0.0030% or less. The content amount of B is preferably 0.0028% or less, more preferably 0.0026% or less, and still more preferably 0.0025% or less.

The chemical composition of the cold rolled steel sheet according to aspects of the present invention may further contain any one or more of Cr, Cu, Ni, Sn, As, Sb, Ca, Mg, Pb, Co, Ta, W, REMs, Zn, Sr, Cs, Hf, and V at 1% or less in total. The content amount is preferably 0.10% or less, and more preferably 0.08% or less. In the case where any one or more of Cr, Cu, Ni, Sn, As, Ca, Mg, Pb, Co, Ta, W, REMs, Zn, Sr, Cs, Hf, and V are contained, the content amount of elements contained is preferably set to 0.0001% or more.

Here, in the case where Sb is contained, a preferred range of the content amount of Sb is 0.005 to 0.015% from the viewpoint of obtaining the effect of improving surface characteristics.

Further, the compositions other than the above (the balance) are iron and incidental impurities. In the case where two or more of B, Ti, and Nb are contained and there are a composition contained in a content amount of less than the lower limit value and a composition contained in a content amount of the lower limit value or more, it is assumed that the composition contained at less than the lower limit value is contained as an incidental impurity.

Next, the steel microstructure of the cold rolled steel sheet according to aspects of the present invention is described.

Average aspect ratio of ferrite crystal grains: 2.0 or less

In the case where an average aspect ratio is more than 2.0, anisotropy of the r-value is likely to be increased. By controlling the average aspect ratio of ferrite crystal grains in the sheet width direction, it becomes likely that material in the sheet width direction will be uniform. To obtain the above effects, the average aspect ratio of ferrite crystal grains needs to be 2.0 or less.

A method for measuring the average aspect ratio of ferrite crystal grains mentioned above is as follows: a photograph of a thickness cross-sectional micrograph parallel to the rolling direction of a steel sheet is taken with a magnification of 400 times by an optical electron microscope, six lines are drawn at intervals of 50 µm or more as the actual length in each of the thickness direction and the rolling direction, and the number of points of intersection of grain boundaries and the lines is counted; a value obtained by dividing the full line length in the rolling direction by the number of points of intersection is taken as a line segment length per ferrite crystal grain, and a value obtained by dividing the full line length in the thickness direction by the number of points of intersection is taken as a line segment length in the rolling direction per ferrite crystal grain. Then, the ratio between the line segment length in the rolling direction and the line segment length in the thickness direction (the line segment length in the rolling direction/the line segment length in the thickness direction) is taken as the aspect ratio. The average aspect ratio is found by calculating at least 30 aspect ratios and averaging these values.

The area fraction of ferrite in the steel microstructure according to aspects of the present invention is not particularly limited; however, to obtain the effects by the adjustment of ferrite crystal grains mentioned above, the area fraction of ferrite is preferably 97% or more.

The steel microstructure of the cold rolled steel sheet according to aspects of the present invention may contain, as well as ferrite, carbonitrides and the like at 3% or less in terms of area fraction.

Next, characteristics of the cold rolled steel sheet according to aspects of the present invention are described.

The cold rolled steel sheet according to aspects of the present invention has a high r-value, and furthermore has small in-plane anisotropy of the r-value. The high r-value is evaluated by an $r_{ave}$ value that is the average value of values obtained by measuring the r-value represented by Formula (1) below in three places apart with spacings of 200 mm in the sheet width direction. The in-plane anisotropy of the r-value is evaluated by $|\Delta r_{ave}|$ that is the average value of values obtained by measuring, in three places apart with spacings of 200 mm in the sheet width direction, |Δr| that is the absolute value of Δr represented by Formula (2) below. In the cold rolled steel sheet according to aspects of the present invention, the $r_{ave}$ value is 1.20 or more, $|\Delta r_{ave}|$ is 0.40 or less, and the difference between the largest value and the smallest value of |Δr| among the three places is 0.15 or less; thereby, press forming can be performed stably. The upper limit of the $r_{ave}$ value is not particularly limited, but is often 1.80 or less in accordance with aspects of the present invention. The lower limit of the absolute value of $|\Delta r_{ave}|$ is not particularly limited, but is often 0.05 or more in accordance with aspects of the present invention. The lower limit of the difference in |Δr| mentioned above is not particularly limited, but is often 0.05 or more in accordance with aspects of the present invention. When measuring three places apart with spacings of 200 mm in the sheet width direction, the measurement places are set to places excluding unsteady portions in end portions of the steel sheet, and may be three places arbitrarily selected as long as they are positions 200 mm apart.

$$r\text{-value} = (r_0 + 2r_{45} + r_{90})/4 \quad \text{Formula (1):}$$

$$\Delta r = (r_0 - 2r_{45} + r_{90})/2 \quad \text{Formula (2):}$$

$r_0$, $r_{45}$, and $r_{90}$ are r-values (Lankford values) in directions of 0°, 45°, and 90°, respectively, based on a rolling direction of the steel sheet.

The cold rolled steel sheet according to aspects of the present invention may be a cold rolled steel sheet having a coating layer on the surface. As the coating layer, all of a hot-dip galvanizing layer, an electrogalvanized plating layer, a hot-dip aluminum coating layer, and the like may be given as examples. The coating layer may be a galvannealing layer obtained by performing an alloying treatment after hot-dip galvanizing.

Next, a method for manufacturing a cold rolled steel sheet according to aspects of the present invention is described.

In the following, a method for manufacturing a cold rolled steel sheet according to aspects of the present invention includes a hot rolling step, a cold rolling step, and an annealing step. In the case where a cold rolled steel sheet having a coating layer is manufactured, a coating step is provided after the annealing step. The temperatures shown below mean, unless otherwise stated, the surface temperatures of slabs (steel raw materials), steel sheets, etc.

The hot rolling step is a step of hot rolling a steel raw material having the chemical composition described above and performing coiling under a condition where the difference in coiling temperature in the sheet width direction is 40° C. or less.

The method for smelting a steel raw material is not particularly limited, and a known smelting method such as a converter, an electric furnace or the like may be employed. It is preferable that, after smelting, the material be made into slabs (a steel raw material) by a continuous casting method, in view of problems such as segregation; however, the material may be made into slabs by a known casting method such as an ingot casting-blooming method or a thin slab continuous casting method. When hot rolling the slab after casting, rolling may be performed after the slab is reheated in a heating furnace; in the case where a temperature of a prescribed temperature or more is held, direct rolling process may be performed without heating the slab.

The resulting steel raw material mentioned above is subjected to rough rolling and finish rolling; in accordance with aspects of the present invention, it is necessary that the carbides in the steel raw material be smelted before rough rolling. In the case where the slab is heated, heating is preferably performed at 1000° C. or more in order to smelt the carbides and prevent an increase in the rolling load. Further, to prevent an increase in scale loss, the heating temperature of the slab is preferably set to 1200° C. or less. Further, as described above, in the case where the steel raw material before rough rolling holds a temperature of a prescribed temperature or more and the carbides in the steel raw material are smelted, the step of heating the steel raw material before rough rolling may be omitted. The rough rolling conditions and the finish rolling conditions do not need to be particularly specified. In accordance with aspects of the present invention, it is preferable that finish rolling be performed with a finish rolling end temperature set to 800° C. or more and 1000° C. or less.

Next, the steel sheet after finish rolling is coiled. In accordance with aspects of the present invention, the coiling temperature does not need to be particularly specified, but the coiling temperature is preferably set to 470 to 750° C.

Difference in coiling temperature in sheet width direction being 40° C. or less

Carbides are generated during coiling. If a difference in coiling temperature in the sheet width direction is reduced, variation in ductility in the widthwise direction due to carbides can be reduced. As a result, the uniformity of material in the sheet width direction is enhanced. To obtain this effect, the difference in coiling temperature is set to 40° C. or less. The difference in coiling temperature in the sheet width direction is evaluated by the temperature difference between a position of ⅛ from an end portion of the sheet width toward the center of the sheet width and a central portion in the sheet width direction. This temperature difference is calculated by measuring the temperature difference between a position of ⅛ from one end portion toward the center of the sheet width and a central portion and the temperature difference between a position of ⅛ from another end portion toward the center of the sheet width and the central portion, and averaging these two temperature differences.

The cold rolling step is a step of cold rolling the hot rolled steel sheet obtained by the hot rolling step at a cold rolling reduction rate of 30 to 75%. The thickness of the steel sheet after the cold rolling step (a cold rolled steel sheet) is preferably 0.8 to 2.4 mm.

When the cold rolling reduction rate in the cold rolling step is 30% or more, there are effects of developing texture and enhancing the r-value. Further, when the cold rolling reduction rate is 75% or less, there is an effect of suppressing the degradation of the sheet shape.

An annealing step is a step of heating a cold rolled steel sheet obtained by the cold rolling step at an average heating rate of 35° C./s or more through a range of 350 to 650° C. in a continuous annealing facility including a pre-heating section, a heating zone, a soaking section, and a cooling zone and performing soaking at a soaking temperature of 700 to 900° C. and for a soaking time of 1 to 200 seconds, and performing, in the soaking, reverse bending four times or more in total with a roll having a radius of 100 mm or more. The "reverse bending" referred to in accordance with aspects of the present invention means bending the steel sheet in one direction and then performing bending back in the opposite direction to the one direction. Here, a series of steps of bending and bending back is counted as one time.

In the pre-heating section, the cold rolled steel sheet is heated. The pre-heating section is necessary for the reason that recrystallization is made before recovery progresses, and texture is developed to raise the r-value. The heating temperature in the pre-heating section is preferably set to 350 to 650° C.

Heating at average heating rate of 35° C./s or more through range of 350 to 650° C.

In the heating zone, heating is performed at an average heating rate of 35° C./s or more through the range of 350 to 650° C. The temperature at which strain energy is reduced and recovery is made is approximately 350 to 650° C. Here, the average heating rate is calculated by dividing the temperature difference between 350° C. and 650° C. by the time taken for heating. In the case where heating is performed at an average heating rate of 35° C./s or more, the nuclei of crystal grains of {111}<112> are preferentially generated and texture is developed, and the r-value is raised. Further, when reverse bending during annealing are performed while high strain energy is kept, the average aspect ratio of ferrite crystal grains is likely to be 2.0 or less. Further, when the average heating rate is 35° C./s or more, $\Delta YP$ is likely to be reduced, and $\Delta r$ is likely to be reduced. The fact that these effects are obtained is presumed to be due to the average aspect ratio of ferrite crystal grains being 2.0 or less. Thus, the average heating rate is set to 35° C./s or more. In the case where transverse IH is used, the heating rate is raised, and is accordingly preferably 45° C./s or more, more preferably 60° C./s or more, and still more preferably 80° C./s or more. From the viewpoint of obtaining the effect according to aspects of the present invention, the upper limit of the average heating rate is not particularly prescribed. From the viewpoint of the uniformity of widthwise characteristics, the average heating rate is preferably 200° C./s or less, and more preferably 100° C./s or less. In the case where the temperature at which the average heating rate is set to 35° C./s or more is set to less than 350° C. or more than 650° C., it is difficult to promote the nucleus generation of crystal grains of {111}<112>; thus, the temperature mentioned above is set to 350 to 650° C.

Annealing conditions (soaking section): soaking at soaking temperature of 700 to 900° C. and for soaking time of 1 to 200 seconds.

To bring the r-value and $|\Delta r|$ within desired ranges, it is necessary to develop {111}<112> recrystallization texture. In the case where the soaking temperature (annealing temperature) is less than 700° C. or the soaking time (annealing time) is less than 1 second, non-recrystallization is left, {111}<112> cannot be developed sufficiently, and the r-value does not come within a desired range. On the other hand, in the case where the soaking temperature is more than 900° C. or the soaking time is more than 200 seconds, ferrite grains grow excessively, and strength is reduced. Thus, annealing conditions are set to a soaking temperature of 700 to 900° C. and a soaking time of 1 to 200 seconds.

Four times or more of reverse bending with roll having radius of 100 mm or more

The fact that, to set the average aspect ratio of ferrite crystal grains to 2.0 or less, four times or more of reverse bending with a roll having a radius of 100 mm or more are necessary during the soaking mentioned above has been found for the first time by aspects of the present invention. If a roll having a radius of less than 100 mm is used, the amount of bending strain is increased, and the steel sheet is extended more; as a result, the average aspect ratio of ferrite crystal grains is likely to be more than 2.0. Thus, the radius of the roll is set to 100 mm or more. The radius of the roll is preferably 200 mm or more, more preferably 300 mm or more, and still more preferably 400 mm or more. When the radius of the roll is set larger, the amount of bending strain is reduced, and also the average aspect of ferrite crystal grains is reduced; thus, the upper limit of the radius of the roll is not limited. If the number of times is less than four, the amount of bending strain is reduced, and {111}<112> recrystallization texture is not developed; thus, the number of times is set to four or more. The number of times of reverse bending is preferably five or more, and more preferably six or more. The upper limit of the number of times of reverse bending is not prescribed, but is often set to ten or less.

The cooling conditions in the cooling zone are not particularly limited, and cooling may be performed under common conditions.

In the case of a method for manufacturing a cold rolled steel sheet having a coating layer on a surface, a coating step is further provided after the annealing step.

The coating step is a step of performing coating treatment on a surface of the cold rolled steel sheet. As the method of coating treatment, an ordinary method may be employed in accordance with the coating layer to be formed. The coating treatment is, for example, a coating treatment that forms a hot-dip galvanizing layer or a coating treatment that forms a galvannealing layer.

EXAMPLES

Slabs of the chemical compositions shown in Table 1 were subjected to hot rolling, cold rolling, and annealing under the conditions shown in Table 2, and cold rolled steel sheets each with a thickness of 1.0 mm were manufactured. The finish rolling end temperature, the coiling temperature, and the soaking temperature in Table 2 mean the temperature of a surface of the steel sheet in a central portion in the sheet width direction.

In the manufacturing conditions of Nos. 1 to 29 and 32 of Table 2, the surface of the cold rolled steel sheet mentioned above was subjected to hot-dip galvanizing treatment and alloying treatment in a continuous hot-dip galvanizing line, and a galvannealed steel sheet (GA) was manufactured.

In the manufacturing conditions of No. 33 of Table 2, the surface of the cold rolled steel sheet mentioned above was subjected to hot-dip galvanizing treatment in a continuous hot-dip galvanizing line, and a hot-dip galvanized steel sheet (GI) was manufactured.

In the manufacturing conditions of Nos. 30 and 31 of Table 2, coating treatment was not performed, and the cold rolled steel sheet (CR) was left as it was.

To investigate material uniformity in the sheet width direction of each steel sheet manufactured in the above manner, samples were extracted from positions of three places apart with spacings of 200 mm in the sheet width direction, and material quality characteristics were investigated. Evaluation was performed by the absolute value of the difference in material (the largest value-the smallest value) among the three places apart with spacings of 200 mm in the sheet width direction. The investigation method is as follows.

(1) Microstructure Observation

A thickness cross section parallel to the rolling direction of the obtained steel sheet was polished, and corroded with 3-volume % nital for appearance. Magnification was made 400 times with an optical electron microscope, and ten fields of view were photographed in a region extending from the surface to a ¼t portion of the thickness (t represents a sheet thickness). Six lines were drawn at intervals of 50 µm or more as the actual length in each of the thickness direction and the rolling direction, the number of points of intersection of the lines drawn in the rolling direction and grain boundaries was counted, and a value obtained by dividing the full line length in the rolling direction by the number of points of intersection was taken as a line segment length in the rolling direction per ferrite crystal grain. Further, similarly, a line segment length in the thickness direction per ferrite crystal grain was obtained. Then, the ratio between the line segment length in the rolling direction and the line segment length in the thickness direction (the line segment length in the rolling direction/the line segment length in the thickness direction) was taken as the aspect ratio. The average aspect ratio is obtained by calculating 30 aspect ratios and averaging these values.

(2) Tensile Property

Using No. 5 test pieces described in JIS Z 2201 in each of which a direction of 90° with respect to the rolling direction was taken as the longitudinal direction (tensile direction), a tensile test conforming to JIS Z 2241 (1998) was performed five times, and the average yield strength (YP) and the average tensile strength (TS) were found. Note that, the average value of three places apart with spacings of 200 mm in the sheet width direction is shown in Table 3.

(3) Measurement of r-Value and $|\Delta r|$

In order to calculate the $r_{ave}$ value, the r-value was calculated in three places apart with spacings of 200 mm in the sheet width direction. Then, the r-values measured in the three places were averaged to obtain the $r_{ave}$ value.

In order to calculate $|\Delta r_{ave}|$, $\Delta r$ was calculated in three places apart with spacings of 200 mm in the sheet width direction. Next, $|\Delta r|$ that is the absolute value of $\Delta r$ was calculated in each of the three places. Then, the values of $|\Delta r|$ of the three places were averaged to calculate $|\Delta r_{ave}|$.

Further, the smallest value was subtracted from the largest value of $|\Delta r|$ of the three places mentioned above, and the difference between the largest value and the smallest value of $|\Delta r|$ was calculated. The difference between the largest value and the smallest value of $|\Delta r|$ is shown as $\Delta|\Delta r|$ in Table 3.

Here, $r_0$ in a direction (a 0° direction, a longitudinal L-direction) parallel to the rolling direction, $r_{45}$ in a direction (a diagonal D-direction) of 45° based on the rolled steel sheet, and $r_{90}$ in a direction (a 90° direction, a transverse C-direction) perpendicular to the rolling direction were found by a tensile test with a predistortion of 15% by using No. 5 test pieces described in JIS Z 2201, and these values were used for the calculation mentioned above. The r-value and $\Delta r$ are as follows.

$$r\text{-value} = (r_0 + 2r_{45} + r_{90})/4$$

$$\Delta r = (r_0 - 2r_{45} + r_{90})/2$$

The results are collectively shown in Table 3.

Further, also for TS, YP, and the r-value, the difference between the largest value and the smallest value was calculated similarly to the difference of $|\Delta r|$; the results are shown in Table 3.

In Present Invention Examples (conforming steel), the difference of $|\Delta r|$ was 0.15 or less, and furthermore $\Delta$TS was 13 MPa or less, $\Delta$YP was 13 MPa or less, and the $\Delta r$-value was 0.4 or less; thus, material uniformity in the sheet width direction was excellent. On the other hand, Comparative Examples (comparative steel) did not satisfy at least any of these items.

Further, since the steel sheets of Present Invention Examples are excellent in material uniformity in the sheet width direction, using the steel sheets allows press forming to be performed stably. Comparative Example No. 14 had a serious problem of gloss unevenness and had poor surface quality, and was hence unsuitable as automotive parts.

TABLE 1

| Steel symbol | Chemical composition (mass %) | | | | | | | | | | |
|---|---|---|---|---|---|---|---|---|---|---|---|
| | C | Si | Mn | P | S | Al | N | B | Ti | Nb | Other |
| A | 0.0022 | 0.21 | 1.98 | 0.079 | 0.009 | 0.05 | 0.002 | 0.0012 | 0.043 | — | — |
| B | 0.0029 | 0.24 | 2.10 | 0.072 | 0.011 | 0.04 | 0.002 | 0.0015 | 0.048 | — | Cr: 0.01 |
| C | 0.0082 | 0.12 | 0.42 | 0.023 | 0.007 | 0.03 | 0.001 | — | — | 0.02 | V: 0.01, Cu: 0.01 |
| D | 0.0120 | 0.08 | 1.82 | 0.009 | 0.015 | 0.04 | 0.001 | — | 0.012 | 0.01 | — |
| E | <0.0003 | 0.68 | 2.45 | 0.015 | 0.014 | 0.02 | 0.001 | 0.0011 | — | — | — |
| F | 0.0009 | 0.92 | 1.65 | 0.055 | 0.012 | 0.02 | 0.002 | 0.0029 | 0.085 | — | — |
| G | 0.0052 | 1.20 | 1.80 | 0.007 | 0.011 | 0.06 | 0.003 | — | 0.012 | — | — |
| H | 0.0039 | 0.007 | 0.70 | 0.010 | 0.013 | 0.05 | 0.002 | — | — | 0.02 | — |
| I | 0.0041 | 0.35 | 3.20 | 0.050 | 0.018 | 0.04 | 0.003 | 0.0017 | 0.041 | — | — |
| J | 0.0031 | 0.11 | 0.08 | 0.052 | 0.015 | 0.04 | 0.002 | 0.0024 | 0.037 | — | — |
| K | 0.0028 | 0.18 | 1.91 | 0.075 | 0.009 | 0.04 | 0.001 | 0.0015 | 0.032 | 0.01 | Zn: 0.01, Sr: 0.002 |
| L | 0.0042 | 0.16 | 2.28 | 0.065 | 0.015 | 0.05 | 0.002 | 0.0008 | 0.028 | — | Pb: 0.01, Ta: 0.002 |
| M | 0.0068 | 0.24 | 1.72 | 0.053 | 0.012 | 0.02 | 0.001 | — | — | 0.01 | As: 0.007, Sb: 0.01 |
| N | 0.0016 | 0.45 | 0.92 | 0.009 | 0.018 | 0.03 | 0.001 | 0.0028 | 0.042 | 0.01 | Co: 0.004, Sn: 0.001 |
| O | 0.0012 | 0.48 | 2.58 | 0.068 | 0.019 | 0.02 | 0.001 | 0.0028 | 0.082 | — | REM: 0.12 |
| P | 0.0035 | 0.25 | 0.34 | 0.072 | 0.013 | 0.04 | 0.002 | 0.0011 | 0.025 | — | W: 0.007, Ni: 0.01 |
| Q | 0.0039 | 0.16 | 0.45 | 0.070 | 0.015 | 0.05 | 0.002 | 0.0018 | — | 0.02 | Ca: 0.0021 |
| R | 0.0086 | 0.65 | 0.25 | 0.025 | 0.008 | 0.04 | 0.002 | 0.0004 | — | — | Hf: 0.005, Cs: 0.001 |
| S | 0.0065 | 0.51 | 0.22 | 0.057 | 0.010 | 0.06 | 0.001 | 0.0006 | 0.012 | — | Mg: 0.001, Ta: 0.0012 |
| T | 0.0028 | 0.21 | 2.05 | 0.072 | 0.010 | 0.05 | 0.002 | 0.0011 | 0.041 | — | Sb: 0.008 |

TABLE 2

| Steel sheet No. | Steel symbol | Hot rolling step Slab heating temperature (°C) | *1 (°C) | Coiling temperature (°C) | *2 (°C) | Cold rolling step Cold rolling reduction rate (°C) | *3 (°C/s) | Annealing step Soaking temperature (°C) | Soaking times (s) | *4 (mm) | *5 (Times) | Raw material classification | Remarks |
|---|---|---|---|---|---|---|---|---|---|---|---|---|---|
| 1 | A | 1100 | 910 | 620 | 20 | 65 | 95 | 750 | 30 | 425 | 5 | GA | Conforming steel |
| 2 | A | 1100 | 900 | 610 | 30 | 65 | 100 | 750 | 35 | 425 | 6 | GA | Conforming steel |
| 3 | A | 1100 | 910 | 620 | 50 | 60 | 50 | 800 | 30 | 425 | 5 | GA | 2 |
| 4 | B | 1100 | 910 | 610 | 20 | 65 | 35 | 750 | 40 | 425 | 5 | GA | Conforming steel |
| 5 | B | 1100 | 910 | 610 | 20 | 65 | 45 | 600 | 40 | 400 | 5 | GA | 2 |
| 6 | B | 1100 | 910 | 610 | 20 | 65 | 45 | 920 | 40 | 400 | 5 | GA | 2 |
| 7 | B | 1100 | 910 | 610 | 20 | 65 | 60 | 750 | 210 | 400 | 5 | GA | 2 |
| 8 | B | 1100 | 910 | 620 | 20 | 60 | 60 | 750 | 40 | 350 | 6 | GA | Conforming steel |
| 9 | B | 1100 | 900 | 610 | 25 | 55 | 20 | 800 | 35 | 400 | 5 | GA | 2 |
| 10 | C | 1100 | 900 | 600 | 25 | 60 | 50 | 800 | 25 | 350 | 6 | GA | Conforming steel |
| 11 | D | 1100 | 910 | 610 | 30 | 65 | 50 | 700 | 50 | 400 | 6 | GA | 2 |
| 12 | E | 1100 | 910 | 620 | 30 | 65 | 50 | 750 | 45 | 400 | 7 | GA | 2 |
| 13 | F | 1100 | 910 | 610 | 25 | 65 | 60 | 800 | 30 | 425 | 6 | GA | Conforming steel |
| 14 | G | 1100 | 900 | 610 | 40 | 65 | 70 | 800 | 35 | 300 | 6 | GA | 2 |
| 15 | H | 1100 | 910 | 610 | 40 | 60 | 70 | 800 | 35 | 300 | 5 | GA | 2 |
| 16 | I | 1100 | 910 | 620 | 40 | 63 | 60 | 800 | 30 | 300 | 5 | GA | 2 |
| 17 | J | 1100 | 910 | 610 | 40 | 55 | 60 | 800 | 30 | 300 | 6 | GA | 2 |
| 18 | K | 1100 | 910 | 610 | 40 | 65 | 80 | 780 | 35 | 400 | 6 | GA | Conforming steel |
| 19 | K | 1100 | 910 | 610 | 35 | 60 | 80 | 780 | 35 | 400 | 3 | GA | 2 |
| 20 | L | 1100 | 910 | 620 | 35 | 63 | 60 | 800 | 30 | 500 | 5 | GA | Conforming steel |
| 21 | M | 1100 | 910 | 610 | 40 | 55 | 60 | 800 | 35 | 500 | 5 | GA | Conforming steel |
| 22 | N | 1100 | 910 | 610 | 40 | 65 | 60 | 790 | 20 | 400 | 4 | GA | Conforming steel |
| 23 | O | 1100 | 910 | 610 | 40 | 65 | 60 | 780 | 30 | 400 | 6 | GA | Conforming steel |
| 24 | P | 1100 | 910 | 610 | 40 | 65 | 80 | 800 | 30 | 425 | 5 | GA | Conforming steel |
| 25 | Q | 1100 | 910 | 610 | 40 | 65 | 80 | 790 | 35 | 425 | 5 | GA | Conforming steel |
| 26 | R | 1100 | 910 | 610 | 40 | 65 | 80 | 780 | 35 | 400 | 6 | GA | Conforming steel |
| 27 | S | 1100 | 910 | 610 | 40 | 65 | 80 | 770 | 38 | 300 | 4 | GA | Conforming steel |
| 28 | T | 1100 | 910 | 610 | 35 | 65 | 80 | 800 | 35 | 425 | 5 | GA | Conforming steel |
| 29 | T | 1100 | 910 | 610 | 35 | 65 | 80 | 800 | 35 | 80 | 5 | GA | 2 |
| 30 | T | 1100 | 910 | 610 | 35 | 65 | 80 | 800 | 35 | 425 | 5 | CR | Conforming steel |
| 31 | A | 1100 | 910 | 620 | 30 | 65 | 95 | 750 | 30 | 425 | 5 | CR | Conforming steel |
| 32 | A | 1100 | 910 | 620 | 30 | 65 | 90 | 750 | 35 | 100 | 4 | GA | Conforming steel |
| 33 | A | 1100 | 910 | 620 | 30 | 65 | 90 | 750 | 35 | 200 | 4 | GI | Conforming steel |

*1: Finish rolling end temperature,
*2: Difference in coiling temperature in the sheet width direction,
*3: Average heating temperature in range of 350 to 650° C.
*4: Radius of roll performing reverse bending,
*5: Number of times of reverse bending
CR: Cold rolled steel sheet,
GI: Hot-dip galvanized steel sheet,
GA: Galvannealed steel sheet

TABLE 3

| Steel sheet No. | *1 | *2 | | | | *3 | | | | Remarks |
|---|---|---|---|---|---|---|---|---|---|---|
| | | TS (MPa) | YP (MPa) | $r_{ave}$ | $|\Delta r_{ave}|$ | ΔTS (MPa) | ΔYP (MPa) | Δr | Δ|Δr| | |
| 1 | 1.4 | 460 | 360 | 1.52 | 0.14 | 8 | 10 | 0.2 | 0.13 | Conforming steel |
| 2 | 1.5 | 465 | 363 | 1.53 | 0.13 | 10 | 12 | 0.2 | 0.12 | Conforming steel |
| 3 | 1.5 | 455 | 355 | 1.35 | 0.20 | 25 | 30 | 0.8 | 0.45 | Comparative steel |
| 4 | 1.3 | 470 | 375 | 1.40 | 0.35 | 7 | 8 | 0.1 | 0.12 | Conforming steel |
| 5 | 2.1 | 460 | 355 | 1.15 | 0.54 | 15 | 20 | 0.4 | 0.18 | Comparative steel |
| 6 | 2.0 | 420 | 310 | 1.12 | 0.58 | 12 | 18 | 0.5 | 0.22 | Comparative steel |
| 7 | 2.2 | 410 | 300 | 1.25 | 0.40 | 18 | 20 | 0.6 | 0.35 | Comparative stee |
| 8 | 1.2 | 475 | 378 | 1.55 | 0.25 | 6 | 8 | 0.1 | 0.11 | Conforming steel |
| 9 | 1.5 | 405 | 315 | 1.15 | 0.42 | 14 | 15 | 0.4 | 0.22 | Comparative steel |
| 10 | 1.8 | 470 | 380 | 1.25 | 0.30 | 11 | 13 | 0.4 | 0.10 | Conforming steel |
| 11 | 1.9 | 490 | 400 | 1.05 | 0.59 | 22 | 20 | 0.5 | 0.32 | Comparative steel |
| 12 | 1.8 | 340 | 260 | 1.18 | 0.42 | 25 | 20 | 0.6 | 0.35 | Comparative steel |
| 13 | 1.6 | 430 | 350 | 1.25 | 0.30 | 10 | 10 | 0.3 | 0.11 | Conforming steel |
| 14 | 1.7 | 480 | 390 | 1.23 | 0.39 | 12 | 14 | 0.4 | 0.14 | Comparative steel |
| 15 | 1.7 | 415 | 310 | 1.22 | 0.38 | 14 | 13 | 0.4 | 0.13 | Comparative steel |
| 16 | 1.8 | 480 | 360 | 1.18 | 0.38 | 18 | 16 | 0.5 | 0.13 | Comparative steel |
| 17 | 1.8 | 390 | 280 | 1.23 | 0.36 | 20 | 25 | 0.4 | 0.13 | Comparative steel |
| 18 | 1.5 | 465 | 365 | 1.30 | 0.34 | 10 | 8 | 0.3 | 0.08 | Conforming steel |
| 19 | 2.3 | 470 | 370 | 1.15 | 0.45 | 26 | 24 | 0.6 | 0.14 | Comparative steel |
| 20 | 1.7 | 478 | 372 | 1.25 | 0.36 | 12 | 10 | 0.4 | 0.10 | Conforming steel |
| 21 | 1.6 | 465 | 360 | 1.25 | 0.34 | 13 | 10 | 0.4 | 0.09 | Conforming steel |
| 22 | 1.6 | 435 | 325 | 1.31 | 0.35 | 11 | 12 | 0.3 | 0.08 | Conforming steel |
| 23 | 1.6 | 440 | 340 | 1.28 | 0.32 | 10 | 9 | 0.4 | 0.08 | Conforming steel |
| 24 | 1.5 | 460 | 350 | 1.30 | 0.30 | 12 | 10 | 0.3 | 0.09 | Conforming steel |
| 25 | 1.4 | 455 | 350 | 1.35 | 0.35 | 12 | 11 | 0.3 | 0.10 | Conforming steel |
| 26 | 1.5 | 465 | 370 | 1.40 | 0.30 | 11 | 10 | 0.3 | 0.11 | Conforming steel |
| 27 | 1.6 | 460 | 365 | 1.41 | 0.32 | 12 | 12 | 0.3 | 0.10 | Conforming steel |
| 28 | 1.4 | 475 | 375 | 1.42 | 0.32 | 9 | 11 | 0.1 | 0.13 | Conforming steel |
| 29 | 2.2 | 470 | 372 | 1.35 | 0.46 | 16 | 15 | 0.6 | 0.42 | Comparative stee |
| 30 | 1.4 | 472 | 376 | 1.45 | 0.30 | 9 | 10 | 0.1 | 0.12 | Conforming steel |
| 31 | 1.4 | 455 | 358 | 1.50 | 0.15 | 8 | 10 | 0.2 | 0.11 | Conforming steel |
| 32 | 1.8 | 463 | 358 | 1.35 | 0.35 | 13 | 13 | 0.3 | 0.14 | Conforming steel |
| 33 | 1.6 | 460 | 360 | 1.42 | 0.28 | 11 | 13 | 0.2 | 0.13 | Conforming steel |

*1: Average aspect ratio of ferrite crystal grains
*2: Average value of three places apart with spacings of 200 mm in the sheet width direction
*3: Difference in material (the largest value − the smallest value) among the three places apart with spacings of 200 mm in the sheet width direction

The invention claimed is:

1. A cold rolled steel sheet comprising a chemical composition containing, in mass %,
C: 0.0003 to 0.010%,
Si: 0.01 to 1.0%,
Mn: 0.10 to 3.0%,
P: 0.005 to 0.15%,
S: 0.020% or less,
Al: 0.01 to 1.00%, and
N: 0.005% or less,
further containing any one or more of
Nb: 0.005 to 0.10%,
Ti: 0.01 to 0.10%, and
B: 0.0001 to 0.0030%, and a balance being iron and incidental impurities, and
having a steel microstructure in which an average aspect ratio of ferrite crystal grains is 2.0 or less,
wherein an $r_{ave}$ value that is an average value of values obtained by measuring an r-value represented by Formula (1) below in three places apart with spacings of 200 mm in a sheet width direction is 1.20 or more, and
$|\Delta r_{ave}|$ that is an average value of values obtained by measuring, in three places apart with spacings of 200 mm in the sheet width direction, $|\Delta r|$ that is an absolute value of Δr represented by Formula (2) below is 0.40 or less and a difference between a largest value and a smallest value of $|\Delta r|$ among the three places is 0.15 or less, $r\text{-value} = (r_0 + 2r_{45} + r_{90})/4$  Formula (1):

$\Delta r = (r_0 - 2r_{45} + r_{90})/2$  Formula (2):

in Formula (1) and Formula (2) above, $r_0$, $r_{45}$, and $r_{90}$ being Lankford values in directions of 0°, 45°, and 90°, respectively, based on a rolling direction of the steel sheet.

2. The cold rolled steel sheet according to claim 1, wherein the chemical composition further contains any one or more of Cr, Cu, Ni, Sn, As, Sb, Ca, Mg, Pb, Co, Ta, W, REMs, Zn, Sr, Cs, Hf, and V at 1% or less in mass % in total.

3. The cold rolled steel sheet according to claim 1, comprising a coating layer on a surface.

4. The cold rolled steel sheet according to claim 3, wherein the coating layer is a hot-dip galvanizing layer or a galvannealing layer.

5. A method for manufacturing a cold rolled steel sheet according to claim 1 the method comprising:
a hot rolling step of hot rolling a steel raw material having the chemical composition and performing coiling under a condition where a difference in coiling temperature in a sheet width direction is 40° C. or less;
a cold rolling step of cold rolling a hot rolled steel sheet obtained by the hot rolling step at a cold rolling reduction rate of 30 to 75%; and
an annealing step of heating a cold rolled steel sheet obtained by the cold rolling step at an average heating rate of 35° C./s or more through a range of 350 to 650° C. in a continuous annealing facility including a preheating section, a heating zone, a soaking section, and a cooling zone and performing soaking at a soaking temperature of 700 to 900° C. and for a soaking time of 1 to 200 seconds, and performing, in the soaking, reverse bending four times or more in total with a roll having a radius of 100 mm or more; thereby producing the cold roiled steel sheet according to claim 1.

6. The method for manufacturing a cold rolled steel sheet according to claim 5, comprising, after the annealing step, a coating step of performing coating treatment.

7. The method for manufacturing a cold rolled steel sheet according to claim 6, wherein the coating treatment is a coating treatment that forms a hot-dip galvanizing layer or a coating treatment that forms a galvannealing layer.

8. The cold rolled steel sheet according to claim 2, comprising a coating layer on a surface.

9. The cold rolled steel sheet according to claim 8, wherein the coating layer is a hot-dip galvanizing layer or a galvannealing layer.

10. A method for manufacturing a cold rolled steel sheet according to claim 2, the method comprising:

a hot rolling step of hot rolling a steel raw material having the chemical composition and performing coiling under a condition where a difference in coiling temperature in a sheet width direction is 40° C. or less;

a cold rolling step of cold rolling a hot rolled steel sheet obtained by the hot rolling step at a cold rolling reduction rate of 30 to 75%; and an annealing step of heating a cold rolled steel sheet obtained by the cold rolling step at an average heating rate of 35° C./s or more through a range of 350 to 650° C. in a continuous annealing facility including a pre-heating section, a heating zone, a soaking section, and a cooling zone and performing soaking at a soaking temperature of 700 to 900° C. and for a soaking time of 1 to 200 seconds, and performing, in the soaking, reverse bending four times or more in total with a roll having a radius of 100 mm or more; thereby producing the cold rolled steel sheet accordine to claim 2.

11. The method for manufacturing a cold rolled steel sheet according to claim 10, comprising, after the annealing step, a coating step of performing coating treatment.

12. The method for manufacturing a cold rolled steel sheet according to claim 11, wherein the coating treatment is a coating treatment that forms a hot-dip galvanizing layer or a coating treatment that forms a galvannealing layer.

* * * * *